United States Patent [19]
Cho

[11] Patent Number: 5,947,440
[45] Date of Patent: Sep. 7, 1999

[54] FLAT-PANEL DISPLAY APPARATUS

[75] Inventor: Chang-Ho Cho, Incheon, Rep. of Korea

[73] Assignee: SamSung Electronics Co., Ltd., Suwon, Rep. of Korea

[21] Appl. No.: 08/965,646

[22] Filed: Nov. 6, 1997

[30] Foreign Application Priority Data

Nov. 6, 1996 [KR] Rep. of Korea ........................ 96-52395

[51] Int. Cl.⁶ ............................ F16M 13/00; H05K 5/00
[52] U.S. Cl. ........................ 248/923; 248/917; 248/919; 361/686
[58] Field of Search ............................ 248/688, 346.03, 248/346.06, 349.1, 910, 917, 918, 919, 920, 921, 922, 923, 183.2, 398; 312/351.2; 345/905, 903; 361/681, 682, 683, 686

[56] References Cited

U.S. PATENT DOCUMENTS

| | | | |
|---|---|---|---|
| 3,936,026 | 2/1976 | Hampel et al. | 248/922 |
| 4,566,663 | 1/1986 | Barchus | 248/324 |
| 4,624,434 | 11/1986 | Lake, Jr. et al. | 248/454 |
| 4,691,886 | 9/1987 | Wendling et al. | 248/183 |
| 4,781,422 | 11/1988 | Kimble | 312/72 |
| 5,081,742 | 1/1992 | Kobayashi | 16/337 |
| 5,088,680 | 2/1992 | Farmer | 248/910 |
| 5,100,098 | 3/1992 | Hawkins | 248/917 |
| 5,247,285 | 9/1993 | Yokota et al. | 248/919 |
| 5,271,594 | 12/1993 | Djelouah | 248/523 |
| 5,569,895 | 10/1996 | Lynch et al. | 248/923 |
| 5,588,625 | 12/1996 | Beak | 248/923 |
| 5,590,021 | 12/1996 | Register | 248/923 |
| 5,632,463 | 5/1997 | Sung et al. | 248/349.1 |
| 5,646,818 | 7/1997 | Hahn | 248/917 |
| 5,666,694 | 9/1997 | Slow et al. | 16/368 |
| 5,786,983 | 7/1998 | Brenner et al. | 361/680 |

*Primary Examiner*—Derek J. Berger
*Assistant Examiner*—Michael Normberg
*Attorney, Agent, or Firm*—Robert E. Bushnell, Esq.

[57] ABSTRACT

A flat-panel display apparatus including a variable flat-panel display unit for multi-directional display of images in accordance with a supplied video signal; a stand unit for supporting the variable flat-panel display unit; and a balancing element of a predetermined mass in the stand unit, for maintaining stability in the apparatus. The balancing element is mounted to the bottom cover of the stand unit and is made of a metal having a high density.

21 Claims, 3 Drawing Sheets

FLAT-PANEL DISPLAY APPARATUS

CLAIM OF PRIORITY

This application makes reference to, incorporates the same herein, and claims all benefits accruing under 35 U.S.C. §119 from my application entitled Flat-panel Display Apparatus earlier filed in the Korean Industrial Property Office on the day of Nov. 6, 1996, and there duly assigned Ser. No. 96-52395 by that office.

BACKGROUND OF THE INVENTION

1. Field of the Invention

The present invention relates to flat-panel visual displays generally, and, more particularly, to flat-panel visual displays that enable multi-directional articulation while maintaining balance and stability.

2. Discussion of Related Art

In general, display apparatuses include a display unit for displaying images according to a supplied video signal and, in some form, a stand unit for supporting the display unit. Usually, display apparatuses include mechanisms for varying the viewing angle of the display unit. Such displays increasingly are in the form of a flat-panel display, specifically, a liquid crystal display (LCD) in which a thin, high-quality LCD panel is sandwiched between front and rear cases, along with a main circuit board generating images thereon according to a video signal input from a personal computer. The LCD panel typically is large in surface area, compared to the display apparatus as a whole and relatively heavy. The stand unit, which should be of a size and weight to support the display unit, conventionally has been as large as the display unit to provide adequate support, i.e., with stability and balance.

To pare down the bulk of the stand unit, which improves appearance and saves desk space, by simply reducing the bottom surface area of the stand unit, a design limit is reached when the stand unit becomes too small to provide stability and balance for the display apparatus. Further, should to the display apparatus topple, which is likely during adjustment of the viewing angle, the LCD panel and associated circuitry are prone to damage.

Exemplars of contemporary practice in the art include U.S. Pat. No. 4,691,886, issued to Wendling et at. for an Adjustable Display Stand which describes a base with a detachable lower segment. The lower segment is not described as counterbalancing a display unit, or possessing any weight that inherently might counterbalance an upsetting, offset display unit center of gravity. U.S. Pat. No. 5,271,594, issued to Djelouah for a Solar Lamp Stand describes a receptacle demountably connected to a box. The box includes a detachable base plate. The base plate is constructed from plastic and has an orifice with which the base plate is fastened to the ground.

After careful study of the exemplars of contemporary practice in the art, I have found a need for a flat-panel display apparatus having a balancing element mounted in the stand unit.

SUMMARY OF THE INVENTION

It is an object of the present invention to provide an improved flat-panel display apparatus that substantially obviates one or more of the problems due to limitations and disadvantages of the related art.

Another object of the present invention is to provide a flat-panel display apparatus which maintains stability and balance, through the stand unit, over a wide range of movement of the display unit relative to the stand unit.

Yet another object of the invention is to provide a flat-panel display apparatus having a miniaturized stand unit which enhances the overall appearance of the display apparatus.

Additional features and advantages of the invention will be set forth in the description, which follows, and, in part, will become apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposes of the present invention, as embodied and broadly described, there is provided a flat-panel display apparatus including: a variable flat-panel display unit for multi-directional display of images in accordance with a supplied video signal; a stand unit for supporting the variable flat-panel display unit; and a balance element of a predetermined mass in the stand unit, for maintaining stability in the apparatus.

The present invention is characterized in that the balance element is mounted to, or may act as, the bottom cover of the stand unit and may be constructed from a metal having a high density.

It is to be understood that both the foregoing general description and the following detailed description are merely exemplary and are intended to provide explanation of the invention as claimed.

BRIEF DESCRIPTION OF THE ATTACHED DRAWINGS

A more complete appreciation of the invention, and many of the attendant advantages thereof, readily will be apparent as same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1A:
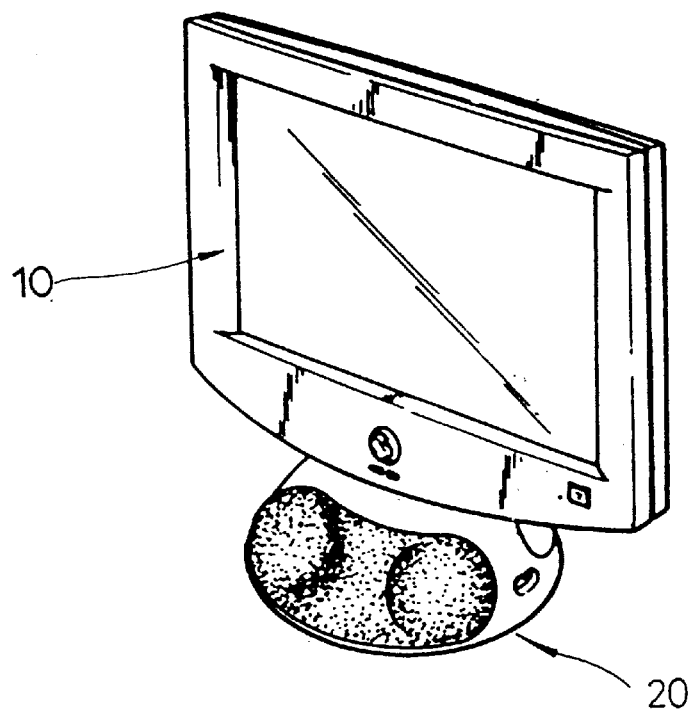
FIGS. 1A and 1B are top right front and left rear perspective views of a flat-panel display apparatus constructed according to the principles of the present invention, respectively.
Figure 1B:
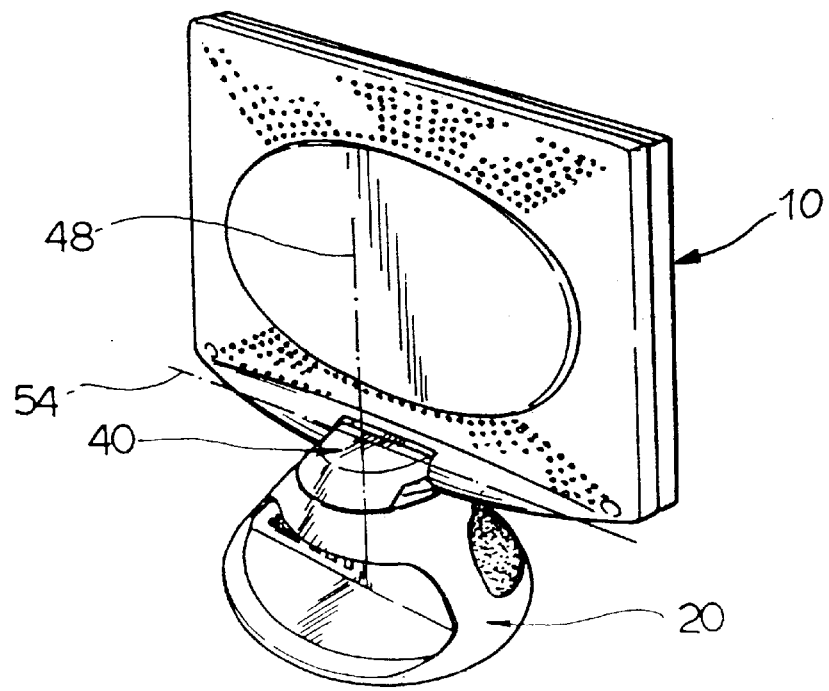

As shown in FIGS. 1A and 1B, the flat-panel display apparatus constructed according to the principles of the present invention largely is divided into a display unit 10 for displaying images according to a display signal, supplied with electrical power; a stand unit 20 for supporting the display unit 10; and a hinge unit 40, shown in FIG. 1B, located between the display unit and stand unit, for rotatably connecting the display unit to the stand unit and allowing dual-axis adjustment of the viewing angle of the display unit as desired. The hinge unit allows for bi-directional rotation of the display with respect to the stand, about both a vertical axis 48 and a horizontal axis 54, shown in FIG. 1B.

Figure 2:
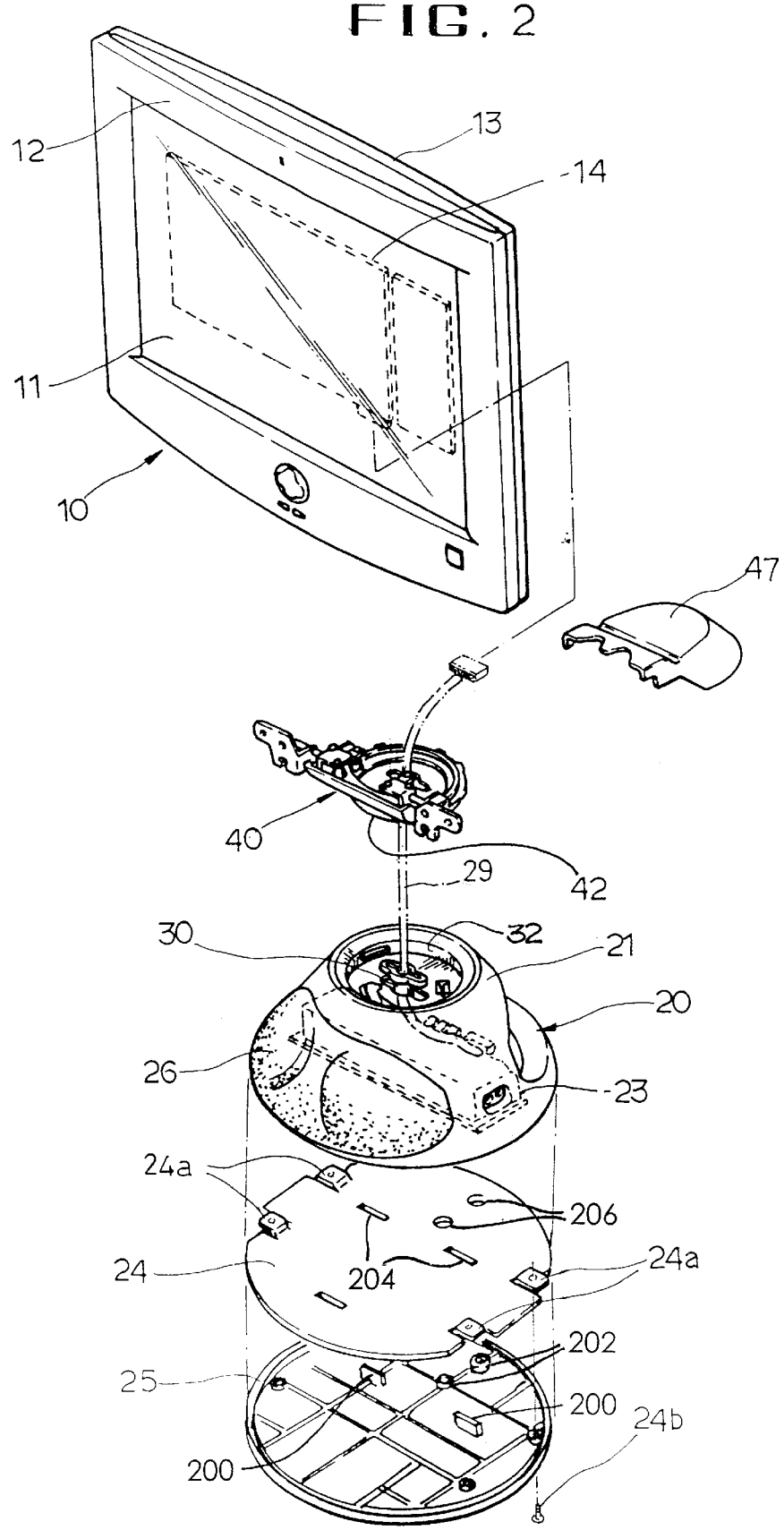
FIG. 2 is a top right front exploded perspective view of the flat-panel display apparatus constructed according to the principles of the present invention.

Referring to FIG. 2, the display unit 10 includes an LCD panel 11 on which images are displayed. Front and rear cases 12 and 13 support the LCD panel 11 and a main circuit board 14 installed on the inside of the rear case 13.

The stand unit 20 includes a speaker cover 26 and an interface circuit board 23 installed in a main body 21. A bottom cover, or base 25, to which a balance element 24 is attached, is fixed to the bottom of the stand unit 20. The balance element 24 preferably is made of a heavy metal. Raised flanges 24a extend from the balance element 24 so that the bottom cover 25 may be used to secure the balance element 24 to the stand body 21 using coupling mechanisms such as screws 24b. In the preferred embodiment of the present invention, although the bottom cover 25 is designed to be fixed to the stand body 21 via the raised flanges 24a, the balance element 24 may itself act as the bottom cover.

Figure 3:
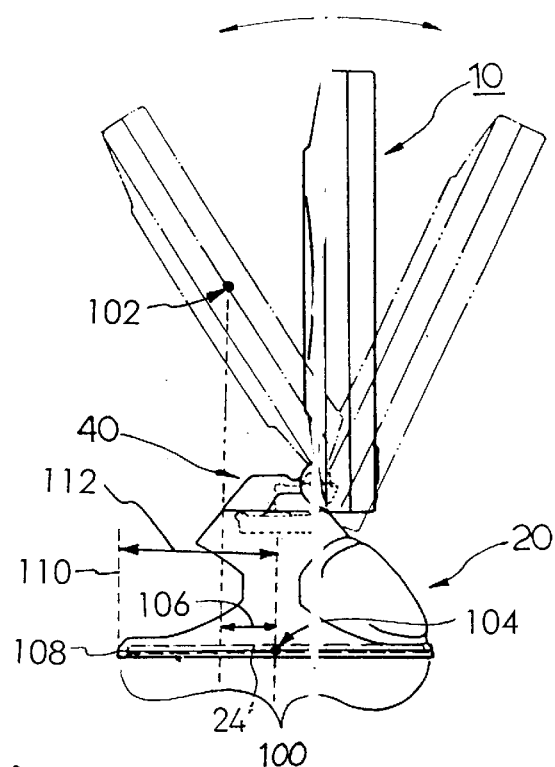
FIG. 3 is a left side elevational view of the flat-panel display apparatus constructed according to the principles of the present invention, alternate tilt positions thereof being depicted in broken lines.
Figure 4:
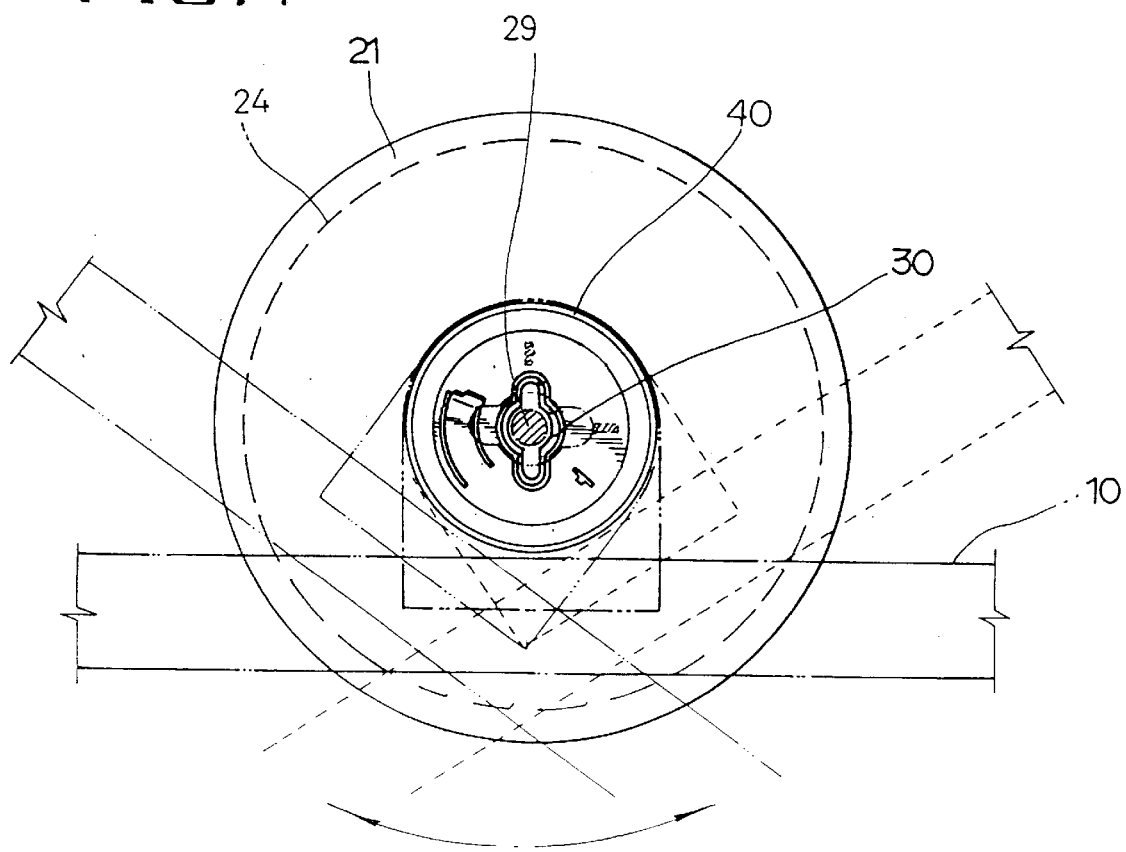
FIG. 4 is a plan view of the flat-panel display apparatus constructed according to the principles of the present invention, alternate swivel positions thereof being depicted in broken lines.

The hinge unit 40 has an annular ridge 42 with the same shape (i.e., round) as a rotary guide recess 32 located on the upper portion of the stand body 21, so that the hinge body may be inserted into the stand unit 20 and slide smoothly when rotated. The hinge unit 40 essentially is provided with both swivel and pivot mechanisms for adjusting the display angle of the display unit 10 along the vertical and horizontal axes 48 and 54, respectively, as shown in FIGS. 3 and 4, which are covered entirely by a cover 47.

A cable 29 transmits display signals and electrical power from the interface circuit board 23 to the main circuit board 14 within the display unit 10. The main circuit board 14 drives the LCD panel 111, to display images thereon. The cable 29 is routed through the center of a vertical hinge shaft 30 about which the hinge unit 40 rotates.

In the flat-panel display apparatus of the present invention, the stand unit 20 is far smaller than the display unit 110, lending to an enhanced appearance and saved desk space. Also, the display unit 10 weighs more than 60% of the total weight of the device, without the balancing element 24. With the balancing element 24, even though the display angle of the display unit 10 may be varied widely such that, as shown in FIG. 3, the relative lateral positioning of the center of gravity 104 of the stand unit 20 with respect to the center of gravity 102 of the display unit 10 would render the display apparatus prone to tip, the flat-panel display apparatus of the present invention does not topple over. The balancing element, having a predetermined mass installed in the base of the stand unit 20, makes the stand unit heavier than the display unit 10. Referring to FIG. 3 in greater detail, the mass of the balance element 24 is established in condition of the footprint 100 of the stand unit 20, so as to counteract the moment ($M_d$) generated by the display unit 10, which is occasioned by its mass ($m_d$) acting over the moment arm ($L_d$) represented as a distance 106 defined between the disparate centers of gravity, or $m_d \times L_d$. The balance element generates a counteracting moment, $M_b$, equivalent to the mass $m_b$, with a center of gravity 104 acting over the moment arm $L_b$, shown on FIG. 3 as distance 112, defined between the center of gravity 104 and the vertical extension 110 of outside edge 108 of the footprint 100: $M_b = m_b \times L_b$. Since the object of the invention is to provide for stability, and such is attained with the moment generated by the balance element exceeds the moment generated by the display unit, when $M_b > M_d$, the optimum mass of the balancing element is reached when $m_b > (m_d \times L_d)/L_b$.

The bottom cover includes a plurality of upstanding tabs 200 and protrusions, or plugs 202 that are received in complementarily-shaped slots 204 and holes, or apertures 206 in the balancing element. The particular arrangement of these cooperative elements assures that when the cover is assembled with the balance element, it may assume only one orientation relative thereto.

As described above, in the present invention, the weight of the stand unit is increased, thereby preventing the flat-panel display apparatus from toppling over and damaging the LCD panel. The imbalance of the overall device due to miniaturizing the stand unit is compensated by inclusion of a balancing element, to provide a more attractive, compact stand unit.

It will be apparent to those skilled in the art that various modifications can be made in the flat-panel display apparatus of the present invention without departing from the spirit of the invention. Thus, it is intended that the present invention cover such modifications as well as variations thereof within the scope of the appended claims.

what is claimed is:

1. A flat-panel display apparatus, comprising:
   a base having a plurality of plugs and a plurality of tabs;
   a balancing element engaged with said base and comprising:
   said balancing element bearing a plurality of apertures receivably engaged by corresponding different ones of said plugs of said base;
   said balancing element bearing a plurality of slots receivably engaged by corresponding different ones of said tabs of said base; and
   a plurality of flanges protruding away from said base;
   a stand attached to said flanges of said balancing element; and
   a variable flat-panel display attached to said stand and displaying variable visual images in accordance with a supplied video signal.

2. The flat-panel display apparatus of claim 1, further comprised of said slots being two in number.

3. The flat-panel display apparatus of claim 1, further comprised of said base being further securable to said balancing element by fastening said base to said flange.

4. The flat-panel display apparatus of claim 3, wherein said base has a perimeter defining the boundries of a first area that is significantly smaller than a second area defined by an entire front side of said variable flat-panel display.

5. The flat-panel display apparatus of claim 4, further comprised of said flanges being four in number.

6. The flat-panel display apparatus of claim 5, wherein said variable flat-panel display unit has a first mass greater than 60% of a second mass defined by said base and said stand.

7. The flat-panel display apparatus as claimed in claim 6, wherein said balancing element increases the weight of said stand to provide stability to said flat-panel displaly apparatus.

8. A display apparatus, comprising:
   a base having both a plurality of plugs and a plurality of tabs;
   a balancing element engaged with said base and comprising:
   a plurality of apertures receivably engaged with said plugs of said base;

a plurality of slots receivably engaged with said tabs of said base; and a plurality of flanges protruding away from said base;

a stand attached to said flanges of said balancing element;

said base further secured to said balancing member by a fastener attached to both said base and one of said flanges; and a variable flat-panel display attached to said stand and displaying variable visual images in accordance with a supplied video signal.

9. The display apparatus of claim 11, further comprising of said base defining a first area that is no more than 40% of a second area as defined by a front side of said variable flat-panel display.

10. The display apparatus of claim 12, wherein said balance element is constructed from a metal material.

11. The display apparatus of claim 13, further comprised of said flanges of said balancing element being parallel to and raised above said balancing member.

12. The display apparatus of claim 14, further comprising a hinge connecting said variable flat-panel display to said stand and allowing the rotation of said said variable flat-panel display relative to said stand.

13. The display apparatus of claim 15, further comprised of said variable flat-panel display rotating about a first axis parallel to said base.

14. A display apparatus, comprising:

a base having both a plurality of plugs and a plurality of tabs;

a balancing element engaged with said base and comprising:

a plurality of apertures receivable engaged with said plugs of said base;

a plurality of slots receivable engaged with said tabs of said base; and a plurality of flanges raised above and parallel to said balancing element on a side opposite from said base;

a stand attached to said flanges of said balancing element; and a variable flat-panel display attached to said stand and displaying variable visual images in accordance with a supplied video signal.

15. The display apparatus of claim 14, further comprised of said tabs being two in number.

16. The display apparatus of claim 15, further comprised of said base being further securable to said balancing element by fastening said base to said flange.

17. The display apparatus of claim 16, further comprising a hinge connecting said variable flat-panel display to said stand and allowing the rotation of said variable flat-panel display relative to said stand about a first axis.

18. The display apparatus of claim 17, further comprised of said first axis being parallel to said base.

19. The display apparatus of claim 18, further comprising said flat-panel display being a liquid crystal display.

20. The display apparatus of claim 19, said flat-panel display exhibiting a first mass that is at least 60 percent of a second mass defined by said display apparatus, excluding said balance element.

21. The display apparatus of claim 19, further comprising of said base defining a first area that is no more than 40% of a second area as defined by a front side of said variable flat-panel display.

* * * * *